(12) United States Patent
Srivastava

(10) Patent No.: US 11,425,101 B2
(45) Date of Patent: Aug. 23, 2022

(54) SYSTEM, APPARATUS AND METHOD FOR TUNNELING AND/OR MULTIPLEXING VIA A MULTI-DROP INTERCONNECT

(71) Applicant: Intel Corporation, Santa Clara, CA (US)

(72) Inventor: Amit Kumar Srivastava, Penang (MY)

(73) Assignee: Intel Corporation, Santa Clara, CA (US)

( * ) Notice: Subject to any disclaimer, the term of this patent is extended or adjusted under 35 U.S.C. 154(b) by 1006 days.

(21) Appl. No.: 15/627,749

(22) Filed: Jun. 20, 2017

(65) Prior Publication Data

US 2018/0367504 A1   Dec. 20, 2018

(51) Int. Cl.
| | | |
|---|---|---|
| G06F 13/14 | (2006.01) | |
| H04L 9/40 | (2022.01) | |
| G06F 13/40 | (2006.01) | |
| G06F 13/38 | (2006.01) | |
| H04L 67/12 | (2022.01) | |

(52) U.S. Cl.
CPC .......... H04L 63/029 (2013.01); G06F 13/385 (2013.01); G06F 13/4027 (2013.01); G06F 13/4086 (2013.01); *H04L 67/12* (2013.01)

(58) Field of Classification Search
CPC .... G06F 13/00; G06F 13/4295; G06F 13/385; G06F 13/4022
See application file for complete search history.

(56) References Cited

U.S. PATENT DOCUMENTS

| | | | | |
|---|---|---|---|---|
| 6,625,163 B1* | 9/2003 | Shideler | ................ | G06F 13/376 370/230 |
| 8,457,268 B2* | 6/2013 | Itou | ........................ | H04L 7/0008 375/356 |
| 2009/0006798 A1* | 1/2009 | Bartley | ................ | G06F 13/1684 711/167 |
| 2010/0169523 A1 | 7/2010 | Dunstan et al. | | |
| 2013/0335151 A1 | 12/2013 | Schrom et al. | | |
| 2014/0016679 A1 | 1/2014 | Kesling et al. | | |

(Continued)

OTHER PUBLICATIONS

U.S. Appl. No. 15/237,928, filed Aug. 16, 2016, entitled "Method, Apparatus and System for Role Transfer Functionality for a Bus Master," by Amit Kumar Srivastava, et al.

(Continued)

*Primary Examiner* — Henry Tsai
*Assistant Examiner* — Kim T Huynh
(74) *Attorney, Agent, or Firm* — Trop, Pruner & Hu, P.C.

(57) ABSTRACT

In one embodiment, an apparatus includes: a first controller to couple to an interconnect to which a plurality of devices may be coupled, the first controller to communicate first information via the interconnect according to the native communication protocol; a first transceiver to drive the first information onto a first line of the interconnect; a second transceiver to drive a clock signal onto a second line of the interconnect; and a second controller to communicate second information via the interconnect. In an embodiment, the native communication protocol is a single-ended communication protocol and the second controller is to communicate the second information differentially via the interconnect. Other embodiments are described and claimed.

20 Claims, 11 Drawing Sheets

(56) References Cited

U.S. PATENT DOCUMENTS

2017/0223646 A1* 8/2017 Romera ............ H04W 52/0235
2018/0181532 A1* 6/2018 Pitigoi-Aron ....... G06F 13/4072

OTHER PUBLICATIONS

U.S. Appl. No. 15/366,001, filed Dec. 1, 2016, entitled "Method, Apparatus and System for Dynamic Clock Frequency Control on a Bus," by Duane G. Quiet, et al.
U.S. Appl. No. 15/198,027, filed Jun. 30, 2016, entitled "Method, Apparatus and System for Dynamic Optimization of Signal Integrity on a Bus," by Duane G. Quiet.
Mipi Alliance, "Specification Brief, Audio & Control: SLIMbus®, SoundWireSM," Oct. 7, 2014, 1 page.
U.S. Appl. No. 15/627,735, filed Jun. 20, 2017, entitled "System, Apparatus and Method for Extended Communication Modes for a Multi Drop Interconnect," by Amit Kumar Srivastava.

\* cited by examiner

SYSTEM, APPARATUS AND METHOD FOR TUNNELING AND/OR MULTIPLEXING VIA A MULTI-DROP INTERCONNECT

TECHNICAL FIELD

Embodiments relate to communication via multi-drop bus structures.

BACKGROUND

Many different types of known buses and other interfaces are used to connect different components using a wide variety of interconnection topologies. For example, on-chip buses are used to couple different on-chip components of a given integrated circuit (IC) such as a processor, system on a chip or so forth. External buses can be used to couple different components of a given computing system either by way of interconnect traces on a circuit board such as a motherboard, wires and so forth.

A recent multi-drop interface technology is an Improved Inter Integrated Circuit (I3C) Specification-based bus, available from the Mobile Industry Processor Interface (MIPI) Alliance™ (www.mipi.org). This interface is expected to be used to connect devices, such as internal or external sensors or so forth, to a host processor, applications processor or standalone device via a host controller or input/output controller. This multi-drop bus provides for single-ended bi-directional data communication with a single-ended clock signal. Another recently developed protocol is the MIPI SoundWire™ protocol, which is defined specially for audio functioning data via a multi-drop bus topology.

DETAILED DESCRIPTION

In various embodiments, techniques are provided to realize flexibility in communications along an interconnect such as a multi-drop bus by allowing devices to communicate according to multiple communication protocols and/or extensions to a given communication protocol. In particular embodiments described herein, by way of multiplexing and/or tunneling, information can be communicated on a bus, configured according to a native communication protocol for single-ended data communication with a corresponding clock signal, at potentially higher speeds than currently supported native modes and/or differentially. In a particular embodiment for use with an I3C-based bus, native communications may be single-ended along a data line of the bus, where these data communications can be sent in concert with a clock signal along a clock line of the bus (or alternately additional data via this clock line). For differential communications, the clock line instead can be leveraged for differential data communication according to an extension to this native communication protocol. While the particular embodiment described herein is directed to communicating audio information according to an extension to an I3C communication protocol, understand the scope of the present invention is not limited in this regard and in other cases, other types of data communications may be performed in a tunneled and/or multiplexed manner at different speeds and modes (e.g., differentially) than a given native communication protocol.

In this way, a system/system on chip (SoC) designer is afforded with greater flexibility and ease of integration for providing additional functionality within a given platform. Still further, embodiments enable support of multiple protocols and functionality without impacting actual bus functionality, and provide scalability for extension to other communication protocols. As will be described herein, increased flexibility is realized for a designer of an SoC or other processor by supporting various other (e.g., audio) protocols over a multi-drop bus such as a sensor bus. In this way, reduced pin counts and bills of materials are realized. For example, to handle N communication protocols, a reduced amount of pins is realized by reusing pins so that an additional 2N+1 pins (where N is the number of communication protocols and one for an interrupt pin) can be avoided.

To enable the communications as described herein, in some embodiments a handshake flow may be performed by a main bus master (such as implemented within a sensor controller) of a sensor sub-system to transfer control of the bus to an audio controller (of an audio sub-system) to enable the audio controller to communicate audio information (such as streaming data) over the bus. Still further to enable this operation, the main master may communicate to various devices on the bus, e.g., by a broadcast command, before entering into this extended mode.

Figure 1A:
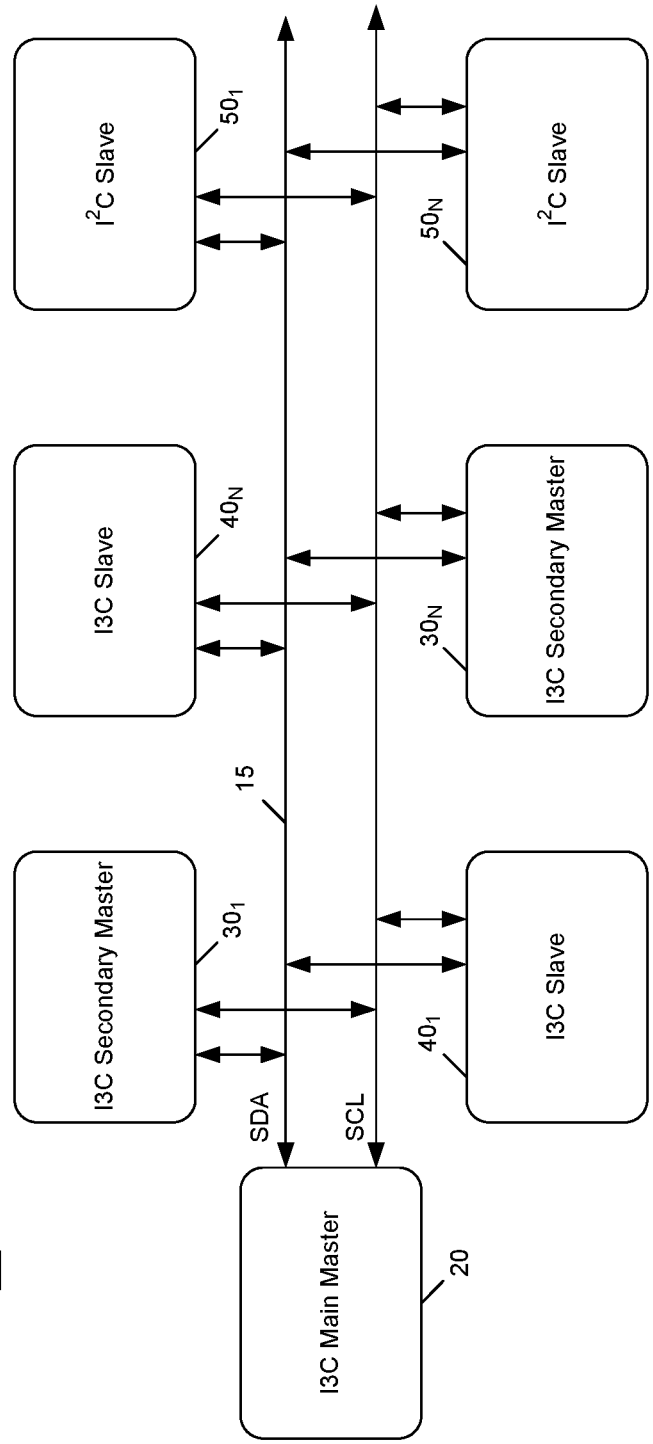
FIG. 1A is a block diagram of a system in accordance with an embodiment of the present invention.

Referring now to FIG. 1A, shown is a block diagram of a system in accordance with an embodiment of the present invention. More specifically, system 10 shown in FIG. 1A represents at least a portion of any one of a variety of different types of computing devices. In different embodiments, such computing devices can range from relatively small low power devices such as a smartphone, tablet computer, wearable device or so forth, to larger devices such as laptop or desktop computers, server computers, automotive infotainment devices and so forth. In any case, system 10 includes a bus 15. In embodiments herein, bus 15 may be implemented as an I3C bus in accordance with a given I3C specification. However, understand the scope of the present invention is not limited in this regard and in other embodiments, bus 15 may be implemented as any type of multi-drop interconnect.

As illustrated, a primary or main master device 20 couples to bus 15. In various embodiments, master device 20 may be implemented as a host controller that includes hardware logic to act as a bus master for bus 15. Master device 20 may include a controller (not shown in the high level view of FIG. 1A) to control data (SDA) and clock (SCL), as well as use (e.g.,) internal current sources or passive pullups to hold bus 15 when all coupled devices are powered off. In some cases, master device 20 may be a relatively simple host controller for a low complexity bus or other multi-drop bus, such as in accordance with an I²C or I3C Specification. Other multi-drop interfaces such as Serial Peripheral Interface and/or Microwire also may be present in a particular embodiment.

In different implementations, master device 20 may be an interface circuit of a multicore processor or other SoC, application processor or so forth. In other cases, master device 20 may be a standalone host controller (such as a given integrated circuit (IC)) or main master device for bus 15. And of course other implementations are possible. For example, as described herein, master device 20 may include multiple independent sub-systems, including a sensor sub-system and an audio sub-system, among potentially others. And as described herein in different modes of operation these various sub-systems may be granted control of bus 15. In other cases, master device 20 may be implemented as hardware, software, and/or firmware or combinations thereof, such as dedicated hardware logic, e.g., a programmable logic, to perform bus master activities for bus 15.

Note that bus 15 is implemented as a two-wire bus in which a single serial line forms a data interconnect and another single serial line forms a clock interconnect. As such, data communications can occur, e.g., in bidirectional manner and clock communication can occur in a single direction. Further as described herein in some modes of operation, data signaling may occur on both clock and data lines, without communication of a separate clock signal. In some instances, this data communication can be differential communication of, e.g., audio data or future camera side-band low resolution differential data or future generation touch sensor data, but not limited to these other applications.

As shown in FIG. 1A, multiple secondary master devices $30_1$-$30_N$ are present. In various embodiments, secondary master devices 30 (generically) may be implemented as dedicated master or bridge devices such as standalone IC's coupled to bus 15. In other cases, these devices may be independent logic functionality of a SoC or other processor (and in some cases may be implemented in the same IC as master device 20 known as a secondary master). As will be described herein one or more such secondary master devices 30 may be controlled to act as bus master for bus 15 while main master device 20 is in a low power state, to enable bus operations to continue to proceed while in this low power state.

As further illustrated in FIG. 1A, a plurality of slave devices $40_1$-$40_N$ also couple to bus 15. In different embodiments, slave devices 40 (generically) may take many different forms. For purposes of discussion herein, it may be assumed that slave devices 40 may be always on (AON) devices, such as sensors like micro-electrical mechanical systems (MEMS), imaging sensors, peer-to-peer devices, debug devices, audio devices or so forth. Still further, in some embodiments additional devices may couple to bus 15, including legacy I²C devices, including I²C slave devices $50_1$-$50_n$. Such devices can communicate via bus 15 according to a given I²C communication protocol, but may not be configured to comprehend signaling according to an I3C communication protocol. Understand while shown at this high level in the embodiment of FIG. 1A, many variations and alternatives are possible.

Figure 1B:
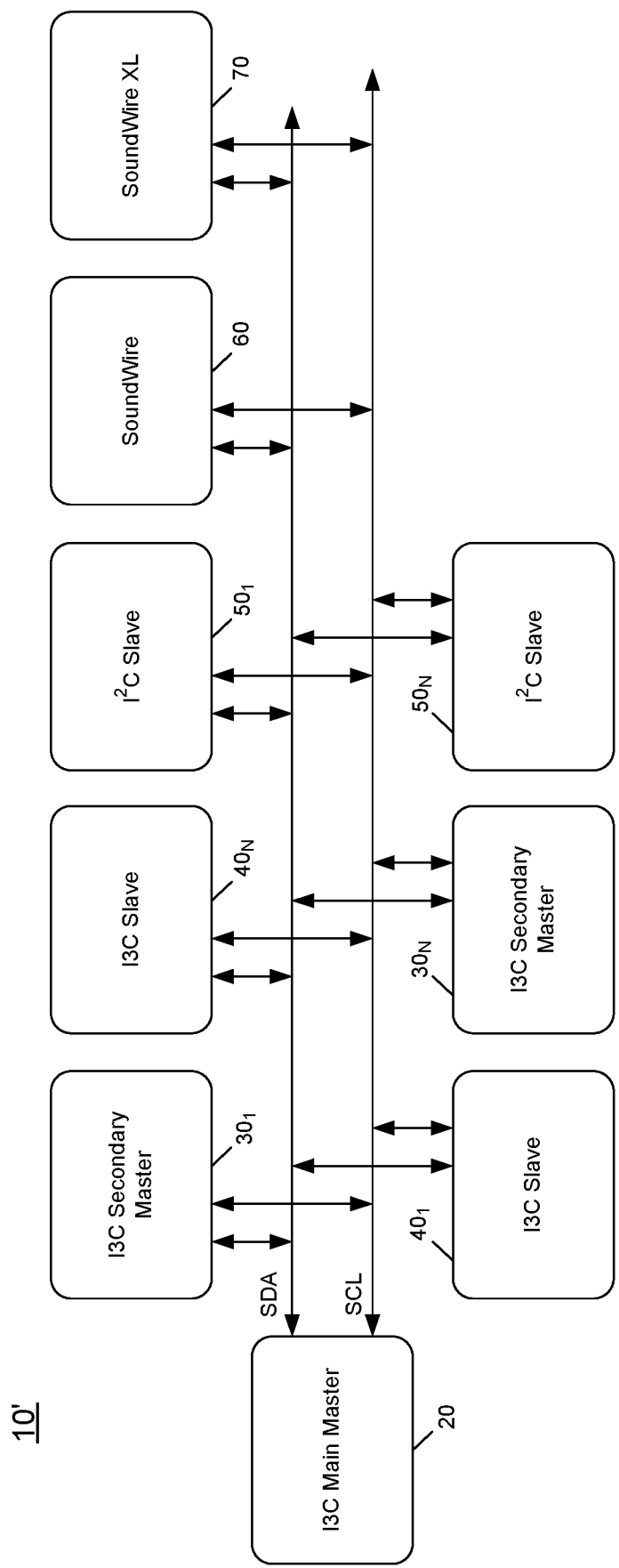
FIG. 1B is a block diagram of a system in accordance with another embodiment of the present invention.

Referring now to FIG. 1B, shown is a block diagram of a system in accordance with another embodiment of the present invention. More specifically system 10' includes similar devices as shown in FIG. 1A. In addition, multiple audio devices also are present. In the particular embodiment of FIG. 1B, a SoundWire™ device 60 and a SoundWire™ XL device 70 also couple to bus 15. As described herein, devices 60 and 70 may communicate audio information according to a given SoundWire™ protocol via bus 15.

Figure 2A:
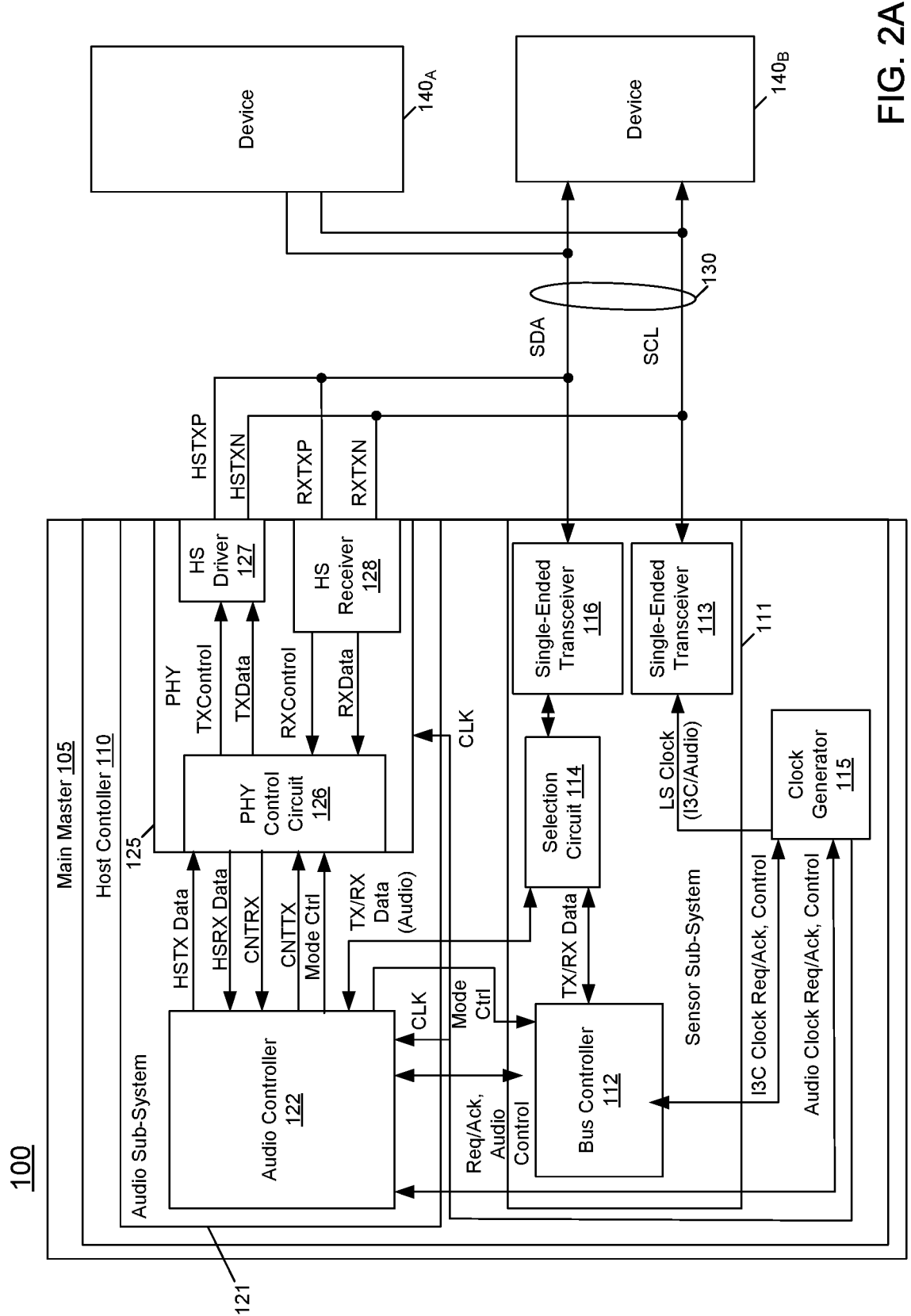
FIG. 2A is a block diagram of a system in accordance with an embodiment of the present invention.

Referring now to FIG. 2A, shown is a block diagram of a system in accordance with an embodiment of the present invention. As shown in FIG. 2A, a portion of a system 100 includes a main master 105 including a host controller 110 coupled to a plurality of devices $140_A$-$140_B$ via a multi-drop bus 130. As an example device $140_A$ may be an audio device and device $140_B$ may be a sensing device, or vice versa. Devices 140 (also referred to herein as "slaves") may have different operational characteristics and also may have different capabilities of being added/removed from bus 130. As will be described herein, host controller 110 may be configured as a bus master, in at least certain operational phases. Bus 130 is implemented as a two-wire bus in which a single serial line forms a data interconnect and another single serial line forms a clock interconnect. As such, data communications can occur in bi-directional manner and clock communications can occur in a unidirectional manner, and with the extended communication modes described herein, differential data such as audio data can be communicated along both and clock data lines at a given speed. Still further in other modes, such audio data can be communicated single-ended with a corresponding clock signal.

At the high level illustrated in FIG. 2A, assume that different types of devices 140 are present. Devices $140_{A-B}$ have, inter alia, different physical placements and electrical performance. Specifically, device $140_A$ may be always powered on and present as being coupled to bus 130. As an example, device $140_A$ may be a given type of sensor, such as an accelerometer or other sensor which may be incorporated in a given system (such as a smartphone or other mobile platform). For purposes of discussion herein, assume that device $140_A$ operates as a slave to host controller 110 (but may also be configured as a secondary bus master).

Device $140_B$ may be powered when it is to be active. As an example, assume that device $140_B$ is another type of sensor, such as a camera device. Or device $140_B$ can be an audio device such as a generator or consumer of audio data. In such instances, device $140_B$ may include a similar audio-subsystem as described with regard to main master 105. In any event, device $140_B$ may be powered on only when a given functionality of the system is active. In other cases device $140_B$ may be a slave device that can be physically added/removed via a hot plug or hot unplug operation, such as a cable, card, or external peripheral device that is coupled to bus 130, e.g., by a cable, external connection or so forth. In still other cases, device $140_B$ may be coupled via an in-box cable. In such cases, there may be a long distance between device $140_B$ and host controller 110. Note that device $140_B$ may be relatively further away from host controller 110 than device $140_A$.

Note that one or more of devices 140 may be configured as an I²C and/or I3C-type device. In some cases one or more devices 140 may be configured to handle communications according to a MIPI SoundWire™ protocol (e.g., a SoundWire™ low speed and/or high speed protocol). In some cases, a given device 140 may be implemented as a hub, secondary master or other device type. Note that in various embodiments, slave devices such as devices 140 may have a similar implementation as host controller 110 with multiple sub-systems (with the possible exception that in a slave mode, a clock receipt operation occurs during low speed mode).

As illustrated in FIG. 2A, main master 105 includes a host controller 110. In the embodiment shown, host controller 110 may itself include (or be coupled to) multiple processing sub-systems. In the embodiment shown in FIG. 2A these processing sub-systems include a sensor sub-system 111 and an audio sub-system 121. Sensor sub-system 111 may, in an embodiment, be configured to manage communications with one or more sensors or other devices 140 coupled to bus 130 where such devices communicate according to a given I3C or I²C communication protocol. To this end, sensor sub-system 111 may include (or be coupled to) a bus controller 112 which may be a primary or master bus controller for bus 130. In turn, audio sub-system 121 may include (or be coupled to) an audio controller 122 which may control audio activities and further, after a handshake process as described herein, be enabled to be a bus controller for bus 130 during audio communications on bus 130.

Bus controller 112 is configured to manage communication, e.g., of sensor data, between sensor sub-system 111 and one or more devices 140. Understand that communications may occur both in transmit and receive directions. To this end, data to be transmitted is communicated from bus controller 112 via a selection circuit 114, which in an embodiment may be implemented with multiplexer/demultiplexer circuitry. In this transmit direction, such data may be communicated via a single-ended transceiver 116 along the data line (SDA) of bus 130. In addition to communication of data information in this manner, a clock signal (e.g., a low speed clock) output by a clock generator 115 may be communicated via a single-ended transceiver 113 along the clock line (SCL) of bus 130.

Note that for such communications operation of clock generator 115 is under control of bus controller 112. Accordingly, clock generator 115 may output this clock signal at a given clock speed (e.g., at low speed or high speed), depending upon a selected mode of communication. In a particular embodiment, low speed data may be communicated at 12.5 megabits per second (Mbps). In turn in this embodiment, high speed data may be communicated at a rate of 400 or more Mbps. Of course other speeds are possible. Understand that in a receive direction for this communication of sensor information, incoming data received via the data line of bus 130 may couple through transceiver 116 and selection circuit 114. In turn that data is provided to bus controller 112 and from there to a given consuming circuit (e.g., a core or another processing circuit of main master 105 (not shown for ease of illustration in FIG. 2A)).

To perform multiplexing and/or tunneling of information according to other communication protocols, audio sub-system 121 (as a representative alternate communication protocol sub-system) also may access bus 130. Furthermore, in some cases audio information communication at higher speeds may occur differentially, leveraging both clock and data lines of bus 130, as described herein. To this end, audio sub-system 121 includes an audio controller 122. In various embodiments, audio controller 122 is configured to transmit audio data at low speeds or high speeds (e.g., according to MIPI SoundWire™ or SoundWire-XL™ modes, namely low speed (single-ended) and (differential) high speed modes, respectively). Similarly, audio controller 122 may be configured to further receive audio information and provide it to a consuming circuit (such as a codec (not shown for ease of illustration in FIG. 2A)), which may be further present within or coupled to main master 105. Note that entry into a given audio communication mode may be initiated either by audio controller 122 or an audio device coupled to bus 130 (e.g., one or more of devices 140).

As seen, to enable audio controller 122 to access bus 130 (e.g., as a master), audio controller 122 issues a request to bus controller 112 to request control of bus 130, which bus controller 112 may grant by way of an acknowledgement to allow audio controller 122 to be bus master for communication of audio data. Also note that during audio operations, audio controller 122 may issue a clock request to clock generator 115 to cause it to generate a clock signal for communication, in certain audio modes.

Audio controller 122 may initiate a handshake with bus controller 122 to enter into an audio communication mode. In an embodiment, audio controller 122 may select a given audio communication mode (e.g., single-ended or differential), and/or speed mode. After handshaking between bus controller 112 and audio controller 122, to provide bus control to audio sub-system 121, the type of data to be communicated and corresponding clock mode are selected. As will be described further in a differential mode, transceivers 113 and 116 of sensor sub-system 111 are not leveraged and may be disabled, e.g., by way of tri-stating these receivers. Finally, before audio sub-system 121 is provided control of bus 130, bus controller 112 may communicate to devices 140 regarding this entry into an extended communication mode, e.g., by sending a broadcast command. In some embodiments, particular common command codes may be sent to indicate the type of extended mode (such as low speed audio or high speed audio), so that appropriate devices can be configured accordingly.

In one embodiment, bus controller 112 may issue a broadcast command to devices 140 regarding entry/exit of, e.g., an audio/sensor communication. In one particular embodiment, bus controller 112 may issue a first special common command code for a SoundWire™ XL mode and a second special command code for SoundWire™ LS mode.

In a transmit direction for low speed audio communication, audio controller 122 couples via selection circuit 114 (of sensor-sub-system 111) and via transceiver 116 to communicate audio information via the data line of bus 130. In embodiments, this low speed communication may be in connection with transmission of a corresponding low speed clock signal (generated in clock generator 115 as controlled by audio controller 122) and via transceiver 113) along the clock line of bus 130.

Instead, when audio controller 122 is dynamically configured for transmitting audio information in a high speed mode, the high speed data communication from audio controller 122 is via a physical (PHY) circuit 125. While in the embodiment of FIG. 2A, PHY circuit 125 is illustrated as being present within audio-sub-system 121, understand the scope of the present invention is not limited in this regard. In other cases, a PHY circuit may be located in another sub-system. In yet other cases, the PHY circuit may be an independent circuit, such as of an input/output (IO) unit of host controller 110, so communication of potentially multiple different communication protocols can be multiplexed and/or tunneled via such PHY circuit.

In the case of audio data communication according to a high speed mode, audio controller 122 may appropriately configure PHY circuit 125 via communication of control information (CNTTX). As illustrated, PHY circuit 125 includes a PHY control circuit 126 and corresponding driver 127 and receiver 128, which may include differential circuitry. Note that in some cases such driver and/or receiver circuitry may be part of shared circuitry (such that in an embodiment, transceivers 113 and 116 may be leveraged for the differential communication described herein, to reduce unnecessary circuitry).

In any event, high speed audio data is provided from audio controller 122 to PHY circuit 125 (as HSTX Data). In turn, this high speed data is communicated internally within PHY circuit 125 from PHY control circuit 126 to driver 127 as TXData. Driver 127 in turn communicates this information differentially (as HSTXP and HSTXN (as configured based on TXControl information). As seen, this communication is via the data and clock lines of bus 130. This high speed audio communication is sent without a corresponding clock signal. Note a given device 140 that receives the audio information may recover the underlying audio data using a clock recovery circuit of the device (which may recover the clock from the data itself). In other cases, a receiving device 140 may include its own clock generator to generate a high speed clock that is used to clock the received audio information.

As further illustrated, audio information may be received within main master 105 via bus 130. Low speed audio information may be received via the data line of bus 130 and communicated via transceiver 116 and selection circuit 114 of sensor sub-system 111 to audio controller 122. Instead when incoming audio information is communicated at high speed, the differential audio information communicated on the data and clock lines of bus 130 may be received within audio controller 122 directly from PHY circuit 125 (as HSRX Data). Note that this incoming audio information is received within receiver 128 differentially as RXTXP and RXTXN. In turn, the received data (RX Data) is communicated through PHY control circuit 126 to audio controller 122 (as HSRX Data). Note that for these high speed communication modes, a high speed clock may be provided from clock generator 115 to audio sub-system 121 (as clock generator 115 is controlled in this case by audio controller 122). Understand while shown at this high level in the embodiment of FIG. 2A, many variations and alternatives are possible.

Figure 2B:
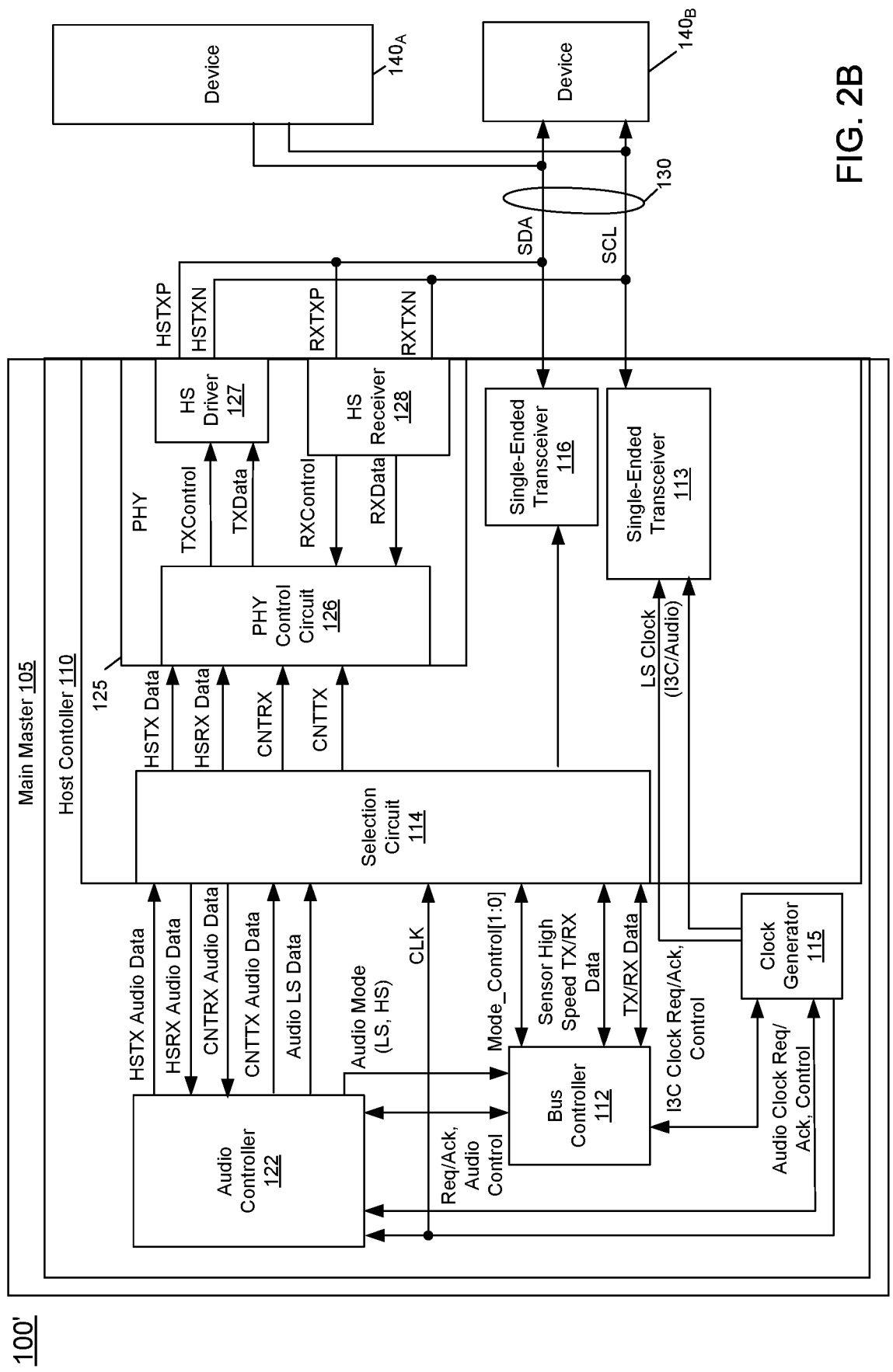
FIG. 2B is a block diagram of a system in accordance with yet another embodiment of the present invention.

Referring now to FIG. 2B, shown is a block diagram of a system in accordance with yet another embodiment of the present invention. As shown in FIG. 2B, the portion of system 100' includes a similar main master 105 and devices $140_A$, $140_B$. Commonly identified numerals in FIG. 2B correspond to those used in FIG. 2A. Note that in the embodiment of FIG. 2B, selection circuit 114 couples between, respectively, audio controller 122 and bus controller 112 and single-ended transceiver 116. Similarly, selection circuit 114 couples between the controllers and PHY circuit 125. Note that mode control signals may be sent from bus controller 112 to selection circuit 114. In the embodiment shown, a two bit control signal (Mode_control[1:0]) is used to provide to selection circuit 114 the desired mode of operation. In an embodiment, bus communications may be configured for the example modes shown in Table 1.

TABLE 1

| Mode Control [1:0] | 00: Sensor SDR/HDR communication, etc. |
| | 01: Sensor high speed communication |
| | 10: Audio LS data communication |
| | 11: Audio high speed data communication |

In other aspects, the embodiment of FIG. 2B operates as discussed above with regard to the embodiment of FIG. 2A.

Figure 3A:
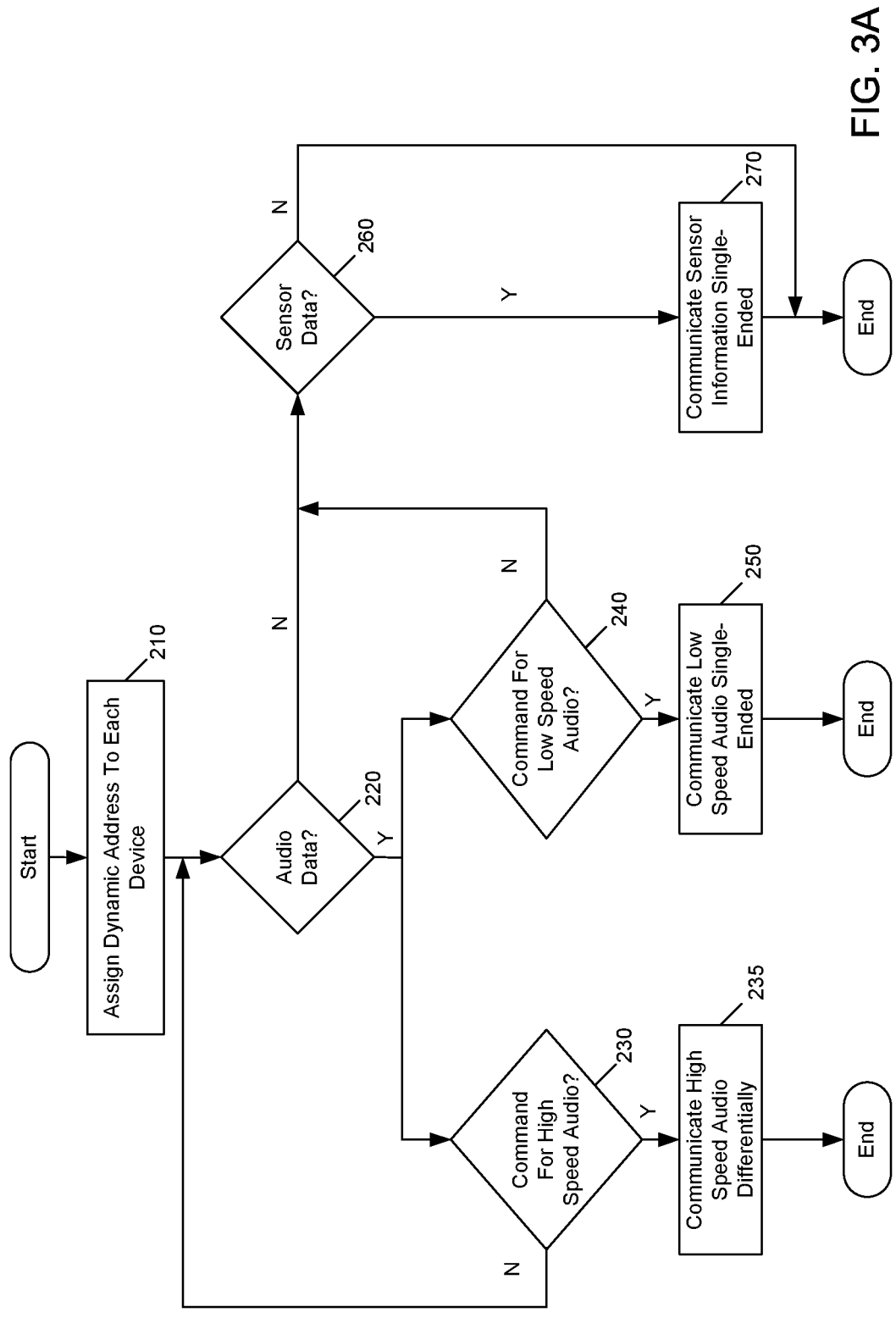
FIG. 3A is a flow diagram of a method in accordance with an embodiment of the present invention.

Referring now to FIG. 3A, shown is a flow diagram of a method in accordance with an embodiment of the present invention. As shown in FIG. 3A, method 200 is a method for communicating information using dynamic mode control as described herein. In embodiments, method 200 may be performed by hardware circuitry, firmware, software and/or combinations thereof. In a particular embodiment, at least some of the operations described in method 200 may be performed by a bus controller and one or more additional controllers of a host controller such as a master device or slave/secondary master device that may have access to the bus, along with various physical circuitry to perform actual data communications.

As illustrated, method 200 begins by assigning a dynamic address to each device (block 210). Such dynamic addressing may be performed during device discovery operations. In an embodiment, a host controller of a main master of a bus may perform this device discovery, e.g., on reset of a system including the bus. Such dynamic assigning of addresses also may occur during operation when a given device is dynamically coupled to the bus (e.g., via a hot plug operation).

At this point, a bus and the devices on it are ready for normal data communications. For the communications shown in FIG. 3A, assume that the bus master receives data from a processing circuit of the main master for communication to one or more devices coupled to the bus. At diamond 220, it is determined whether the data is audio data. Note that this determination may be based, for example, on header information of the incoming data that identifies the type of data. If it is determined that the incoming data for communication is audio data, control passes in parallel to both diamonds 230 and 240 to determine whether a given command (e.g., a common command code (CCC)) is for high speed or low speed audio. If it is determined that communication is to be at high speed, control passes from diamond 230 to block 235 where high speed audio data can be communicated differentially. As discussed above this differential communication may occur along both clock and data lines of the bus and may be at high speeds (e.g., at speeds greater than approximately 400 Mbps). Furthermore, understand that a differential PHY circuit (which may be within an audio-sub-system or independently included within a main master) may, after appropriate configuration, communicate the audio data differentially at high speed.

Instead if it is determined that the communication is to be for low speed audio (as determined at diamond 240), control passes to block 250 where low speed single-ended audio data can be communicated. As discussed above this audio communication may be sent on the data line of the bus in concert with a clock signal send on the clock line of the bus. In an embodiment, this communication may be via single-ended transceivers such that the differential PHY circuit may be placed in a disabled or low power mode.

Still with reference to FIG. 3A, if it is determined that data to be communicated is not audio data but instead is sensor data (as determined at diamond 260), control passes to block 270 where sensor information can be communicated single-ended. As such, this sensor communication may be sent via the data line of the bus, with a corresponding clock (e.g., a low speed clock) communicated along the clock line. In some embodiments, a single PHY circuit of a host controller may send this sensor communication. In other embodiments, a single-ended physical circuit (such as single-ended transceivers of a sensor sub-system) may communicate this information. Understand that embodiments are not limited in this regard and in other cases, additional types of data may be communicated via a bus as described herein in a multiplexed and/or tunneling manner. For example, in other cases, an extension to a given communication protocol such as an I3C communication protocol may enable other types of data to be communicated differentially and/or at speeds higher than native communication speeds for the communication protocol. Understand that different types of information, including sensor information, camera information and so forth may be communicated via tunneling and/or multiplexing to enable a single bus to be used with multiple devices of potentially different communication protocols.

Figure 3B:
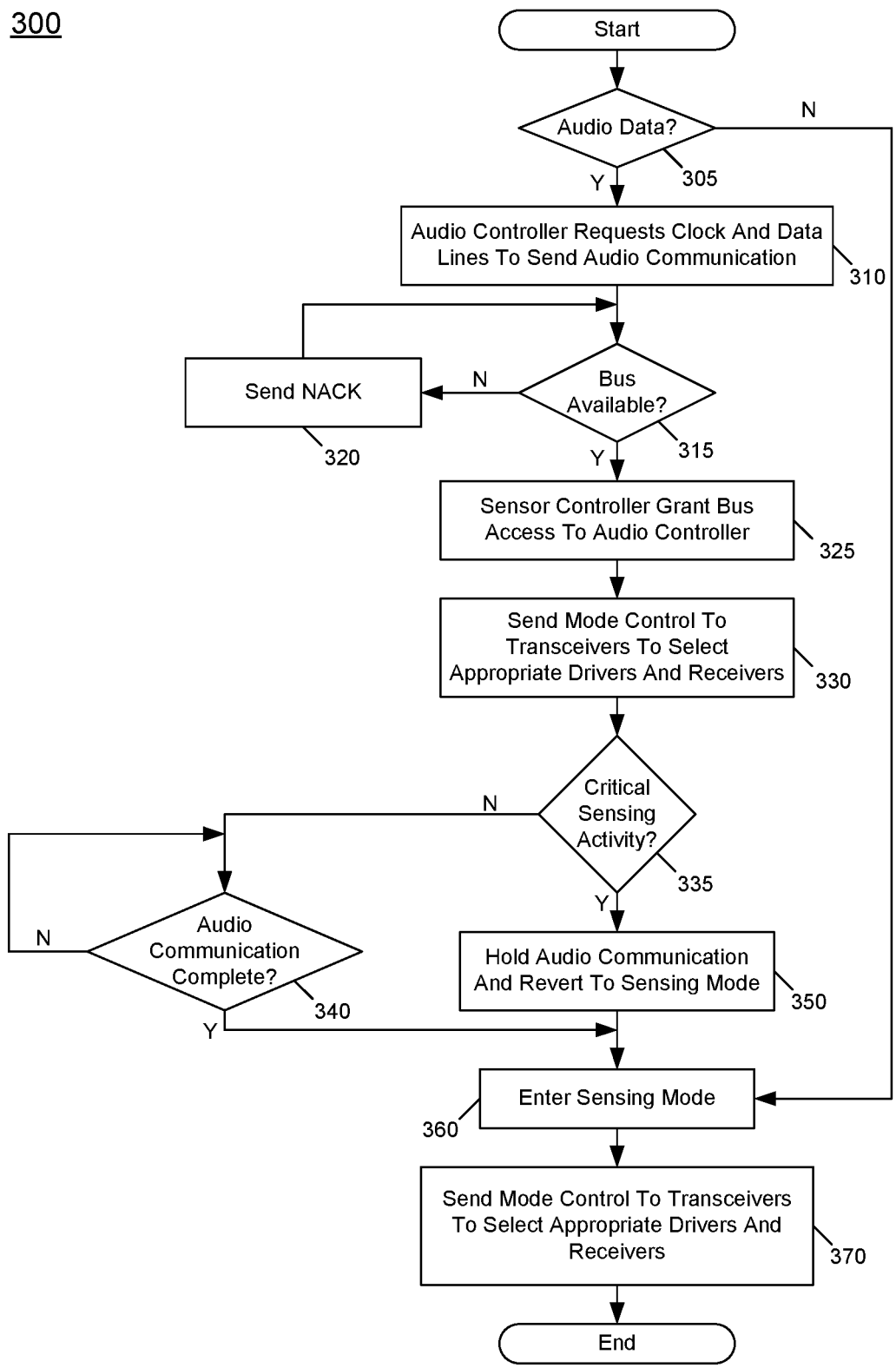
FIG. 3B is a flow diagram of a method in accordance with another embodiment of the present invention.

Referring now to FIG. 3B, shown is a flow diagram of a method in accordance with another embodiment of the present invention. As shown in FIG. 3B, method 300 is a method for performing a handshake between a first controller and a second controller for transmission activities, which in an embodiment may be a sensor controller including a main bus controller and an audio controller. In embodiments, method 300 may be performed by hardware circuitry, firmware, software and/or combinations thereof.

As illustrated, method 300 begins by determining whether there is audio data to communicate (diamond 305). Assuming so, control passes to block 310 where the audio controller requests the clock and data lines to be configured to send audio data. Next it is determined at diamond 315 if the bus is available. If not, control passes to block 320 where a NACK may be sent.

When it is determined that the bus is available, control passes to block 325 where the sensor controller grants bus access to the audio controller. At block 330 mode control signals may be sent to the transceivers to select appropriate drivers and receivers for the audio communication (depending on whether the data is to be sent differentially or single ended). And at this point, after selecting the appropriate drivers and/or receivers, audio communications may occur under the audio controller control of the bus. Next it is determined at diamond 335 whether there is critical sensing activity occurring. If not, control passes to diamond 340 to determine whether the audio communication is completed. Note that if it is determined that there is critical sensing activity, control passes to block 350 where audio communication may be held and control may revert to the sensing mode.

As further illustrated, at block 360 control may revert to the sensing mode. As such at block 370 appropriate mode control signals are sent to the transceivers to select appropriate drivers and receivers for communication of sensor data. Understand while shown at this high level in the embodiment of FIG. 3B, many variations and alternatives are possible.

Figure 3C:
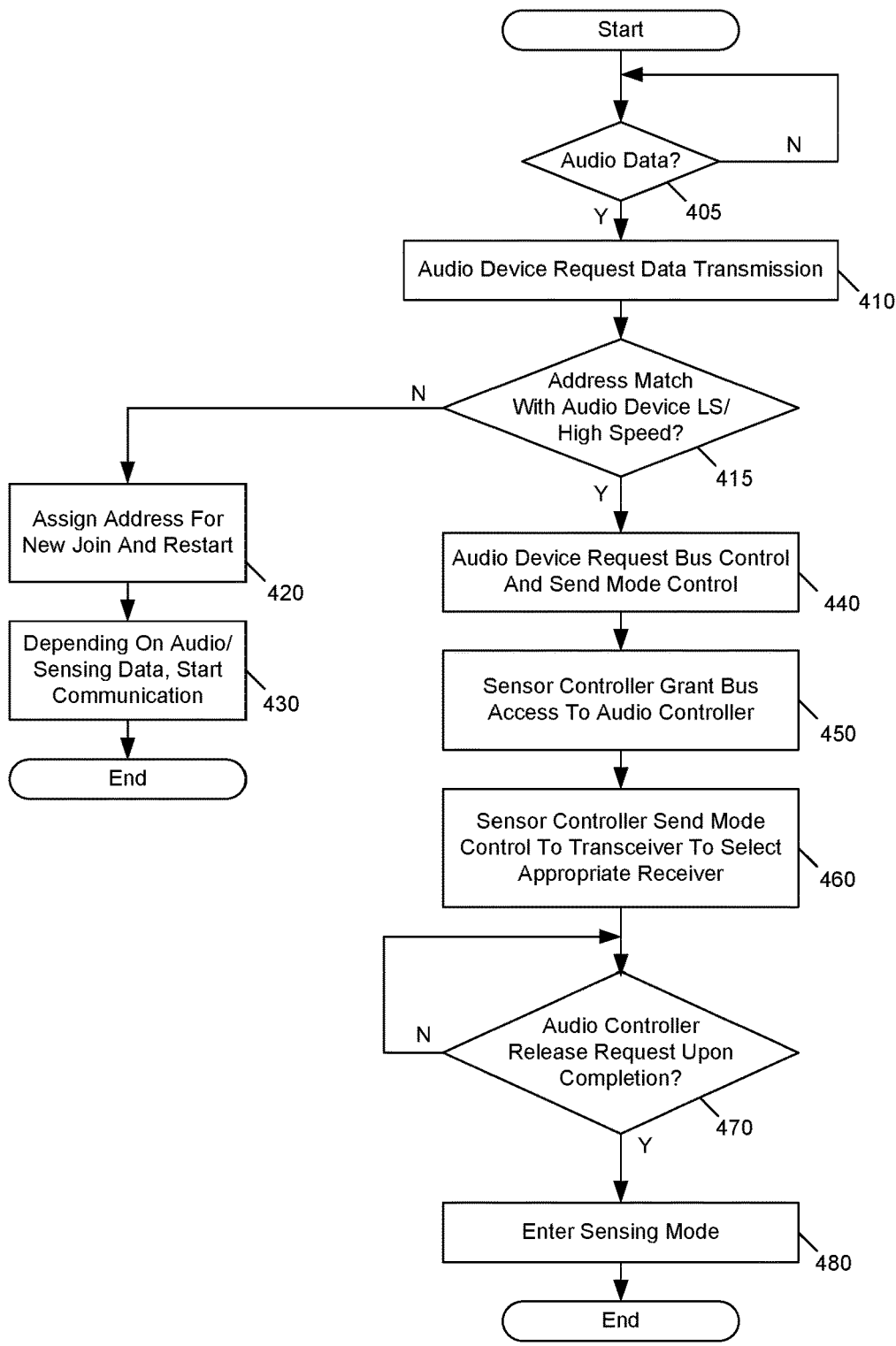
FIG. 3C is a flow diagram of a method in accordance with yet another embodiment of the present invention.

Referring now to FIG. 3C, shown is a flow diagram of a method in accordance with yet another embodiment of the present invention. As shown in FIG. 3C, method 400 is a method for performing a handshake between a first controller and a second controller for receiving activities, which in an embodiment may be a sensor controller including a main bus controller and an audio controller. In embodiments, method 400 may be performed by hardware circuitry, firmware, software and/or combinations thereof.

As illustrated, method 400 begins by determining whether there is audio data to communicate (diamond 405) assuming so, control passes to block 410 where an audio device requests a data transmission. Control then passes to diamond 415 to determine whether the address matches with an audio device having a given mode of operation (e.g., low speed or high speed). If not, control passes to diamond 420 where, if the audio device is a new device, an address may be assigned and the communication process restarted. At block 430 depending upon audio/sensing data, communication may start.

Instead if it is determined at diamond 415 that an address match occurs, control passes to block 440 where the audio device may request bus control and send a mode control signal for the desired mode of audio communication. Then at block 450 the sensor controller grants bus access to the audio controller. Next at block 460, the sensor controller sends mode control signals to the transceiver to select an appropriate receiver for receiving the audio communication, which may thus begin. At diamond 470 it is determined whether the audio controller has released its ownership of the bus upon completion of the audio communication. When that occurs, control passes to block 480 where the sensing mode may be entered. Understand while shown at this high level in the embodiment of FIG. 3C, many variations and alternatives are possible.

Figure 4:
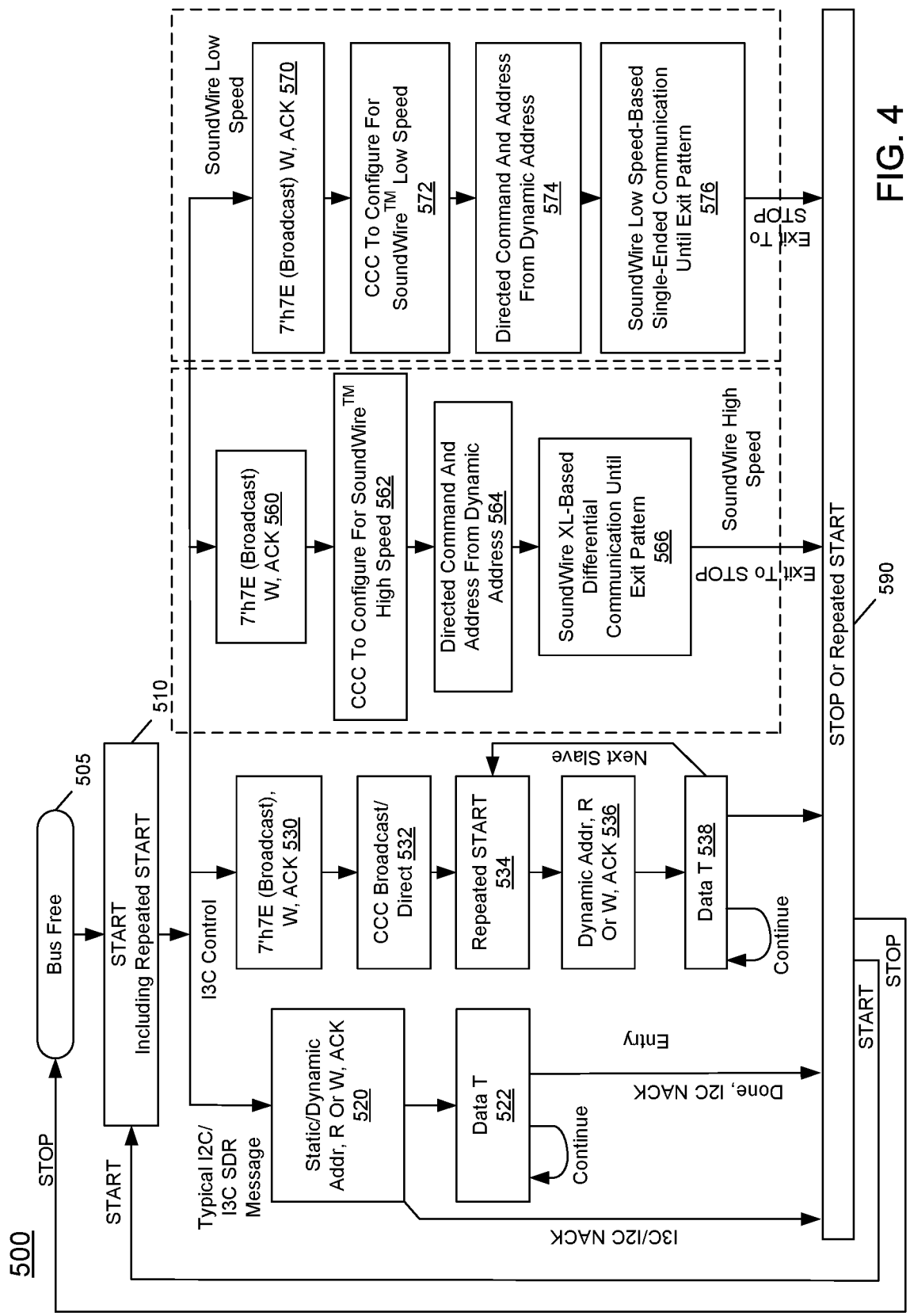
FIG. 4 is a flow diagram of communications on a multi-drop bus in accordance with an embodiment of the present invention.

Referring now to FIG. 4, shown is a flow diagram of communications on a multi-drop bus across a bus such an I3C bus. Method 500 may be performed by any device capable of communicating on the bus, when it acts in a master mode to communicate information to one or more other devices coupled to it via the bus. As illustrated, method 500 begins at block 505 by determining that the bus is free. This determination may be based upon signaling on the bus. For example, in one embodiment a steady logic high value (e.g., VDD) on the data line of the bus indicates that no other entity has control of the bus. Next control passes to block 510 where the device may begin a bus communication by a START protocol (which may include a repeated start protocol). START is used to start communication after the bus is idle, for example, when data line and clock line are both at a logic high level, and a master/slave wants to start communication. In this case, one device (master or slave) pulls down the SDA line low, then after seeing the data line low, another device (slave/master) pulls the clock line low for a longer time as an indication of ACK. After that, bus communication starts. A Repeated START is used in cases of multiple data transfers of, e.g., 8 bit packets, such that after sending 8 bits, another 8 bits will transfer by sending repeated start signals as an indication that further data will be transferred.

As illustrated, many different types of communications may occur on the bus. Such communications may include native communications according to an I3C protocol, a high speed differential audio communication as described herein according to an extended I3C protocol, or I²C communication protocol. Of course understand that embodiments may leverage an interconnect such as the I3C bus described herein to communicate according to other protocols, e.g., by way of multiplexing and/or tunneling, such that the expense of additional pins for a given processor or other SoC can be avoided. As such, communication according to other communication protocols may occur via tunneling within packets, so that various entities can multiplex use of a single interconnect (and single set of pin structures) to reduce consumption of chip real estate.

Starting with the leftmost path of FIG. 4, assume that a communication is to be a typical I²C or I3C SDR message. In this instance, a given message such as a read (R), write (W) or acknowledgment (ACK) may be communicated as part of a header packet with a dynamic/static address for a given device to which the communication is directed (block 520). Thereafter, depending upon the type of communication, data and/or an ACK can be communicated (block 522). Note that at a conclusion of a communication, a DONE message may be issued to indicate no further communication, causing both data and clock lines to drive high. Or in case of an error, a no acknowledge (NACK) may be sent and control passes to block 590 where a STOP or Repeated START may occur. Depending upon which event occurs, control passes back to block 505 or block 510.

Still with reference to FIG. 4, if instead a message is an I3C control type message, control passes to block 530 where a broadcast command is sent. Next control passes to block 532, where a broadcast command is sent having a CCC for a broadcast or direct message. Thereafter at block 534 a repeated START may occur for each device of the communication. Then at block 536, a given message such as a read (R), write (W) or acknowledgment (ACK) may be communicated with a dynamic address by issuing as part of header packet. Next at block 538 a data transmission occurs. If there is another slave device present for this communication, control passes back to block 534.

As illustrated in FIG. 4, a bus controller may initiate a high speed audio communication by sending a broadcast message (e.g., 7Eh) (block 560), followed by sending a common command code (e.g., 0x34h) to configure appropriate devices to this high speed audio mode (e.g., as a SoundWire-XL™ mode) (block 562). Only devices having a matching address for this mode will participate. Thereafter, the bus controller sends/receives a directed command (e.g., 0x9Eh) and dynamically assigned addresses to respective devices (block 564). Only devices having a matching address will be able to start communication.

At this point, the bus controller completes a handshake process with the audio controller, and tri-states one or more single-ended transceivers. Then the bus controller communicates to the audio controller regarding bus grant and enters into a low power mode. The audio controller next sends a command to the clock generator for controlling a frequency of a clock signal to be provided to the audio controller and a differential physical circuit. At this point, the device is configured for differential high speed communication, and sends audio communications differentially and at high speed to one or more devices (e.g., beginning with an entry pattern, then the audio data, and then an exit pattern) (block 565). After communication completes, the audio controller sends control back to the bus controller, to enable the bus controller to regain bus control.

As further illustrated in FIG. 4, a bus controller may initiate a low speed audio communication by sending a broadcast message (e.g., 7Eh) (block 570), followed by sending a common command code (e.g., 0x44h) (block 572) to configure appropriate devices for this low speed audio mode (e.g., as an indication of SoundWire™-LS mode). Only devices having a matching address for this mode will participate. Thereafter, the bus controller sends/receives a directed command (e.g., 0xAEh) and dynamically assigned addresses to respective devices (block 574). Only devices having a matching address will be able to start communication.

At this point, the bus controller completes a handshake process with the audio controller, and the audio controller tri-states the differential physical circuit. Then the bus controller communicates to the audio controller regarding bus grant and enters into a low power mode. The audio controller then sends a command to the clock generator for controlling a frequency of a clock signal to be provided via the clock line of the bus. At this point, the device is configured for single-ended low speed communication, and sends audio communications in this manner to one or more devices (e.g., beginning with an entry pattern, then the data, and then an exit pattern) along the data line of the interconnect (with a corresponding clock signal via the clock line of the interconnect) (block 576). After communication completes, the audio controller sends control back to the bus controller, to enable the bus controller to regain bus control. Understand that while examples describe an audio subsystem, it is possible to extend embodiments to camera, touch and other sub-systems that use differential transceivers. Tunneling of other protocols also is a possible example, such as camera, touch or other communication protocols.

Figure 5:
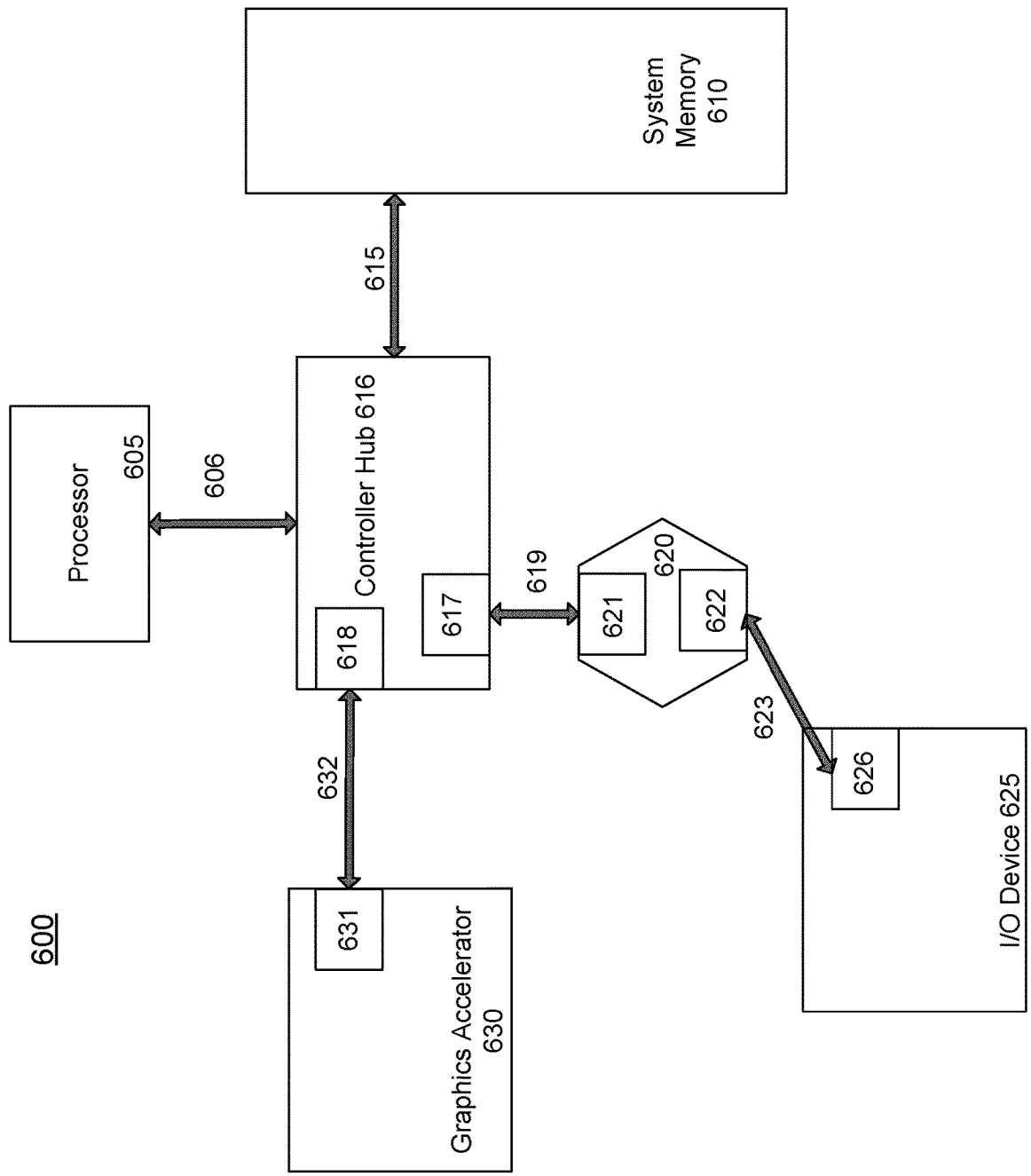
FIG. 5 is an embodiment of a fabric composed of point-to-point links that interconnect a set of components.

Embodiments may be implemented in a wide variety of interconnect structures. Referring to FIG. 5, an embodiment of a fabric composed of point-to-point links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect. In another embodiment, link 606 includes a parallel serial, differential interconnect architecture that is compliant with different interconnect standards, and which may couple with one or more host controllers to perform delay determination and clock adjustments as described herein.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a PCIe interconnection hierarchy. Examples of controller hub 615 include a chip set, a memory controller hub (MCH), a northbridge, an interconnect controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e., up a hierarchy towards a root complex, to controller hub 615 and downstream, i.e., down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example, and which may operate in multiple modes, including the differential modes described herein. Often in the PCIe vernacular, such a device is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. A graphics controller or the graphics accelerator 630 itself may be integrated in processor 605.

Figure 6:
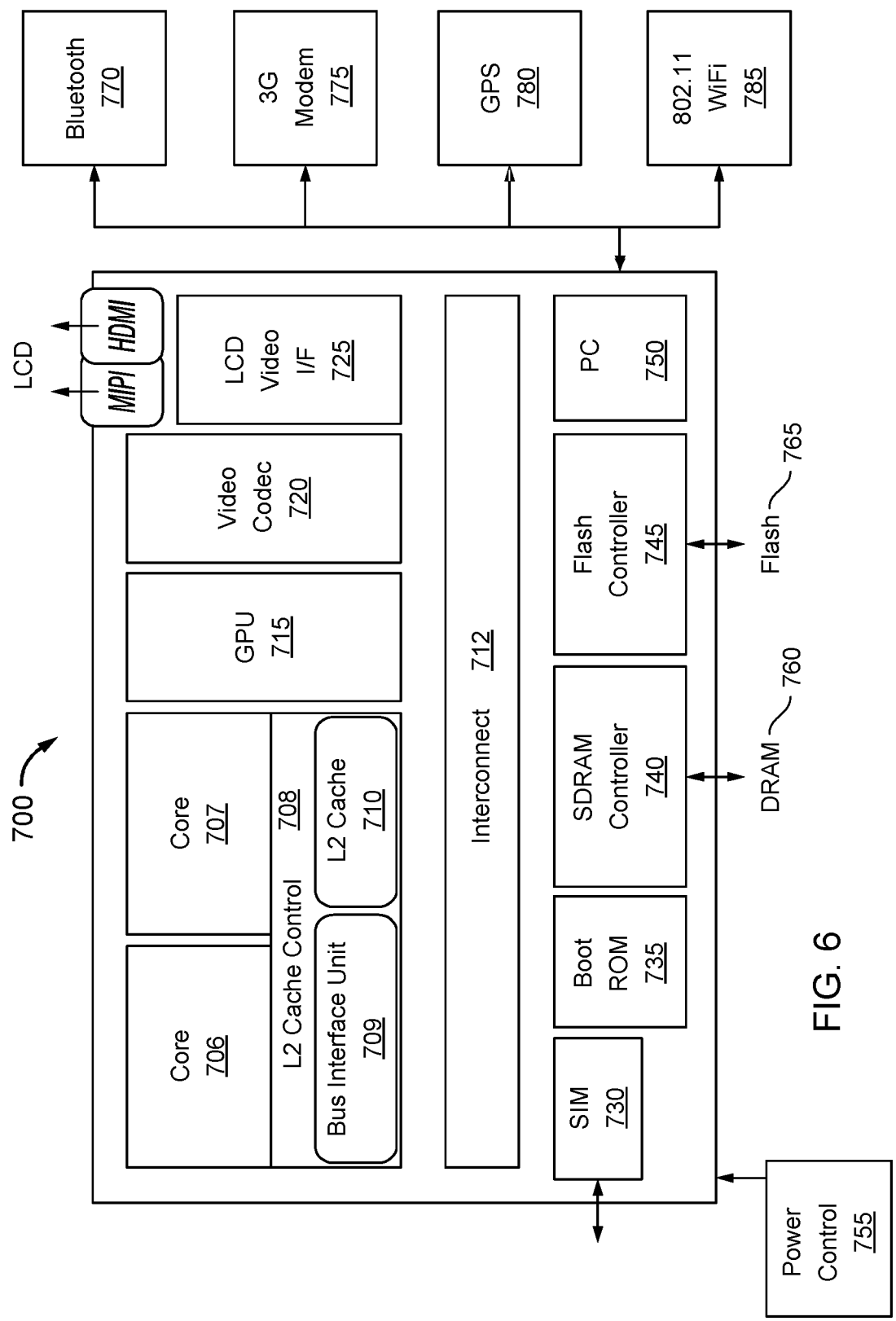
FIG. 6 is an embodiment of a system-on-chip design in accordance with an embodiment.

Turning next to FIG. 6, an embodiment of a SoC design in accordance with an embodiment is depicted. As a specific illustrative example, SoC 700 may be configured for insertion in any type of computing device, ranging from portable device to server system. Here, SoC 700 includes 2 cores 706 and 707. Cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700 via an interconnect 712.

Interconnect 712 provides communication channels to the other components, such as a Subscriber Identity Module (SIM) 730 to interface with a SIM card, a boot ROM 735 to hold boot code for execution by cores 706 and 707 to initialize and boot SoC 700, a SDRAM controller 740 to interface with external memory (e.g., DRAM 760), a flash controller 745 to interface with non-volatile memory (e.g., flash 765), a peripheral controller 750 (e.g., an eSPI interface) to interface with peripherals, video codecs 720 and video interface 725 to display and receive input (e.g., touch enabled input), GPU 715 to perform graphics related computations, etc. Any of these interconnects/interfaces may incorporate aspects described herein, including the ability to communicate according to multiple modes, including the differential high speed, low swing communications described herein. In addition, the system illustrates peripherals for communication, such as a Bluetooth module 770, 3G modem 775, GPS 780, and WiFi 785. Also included in the system is a power controller 755.

Figure 7:
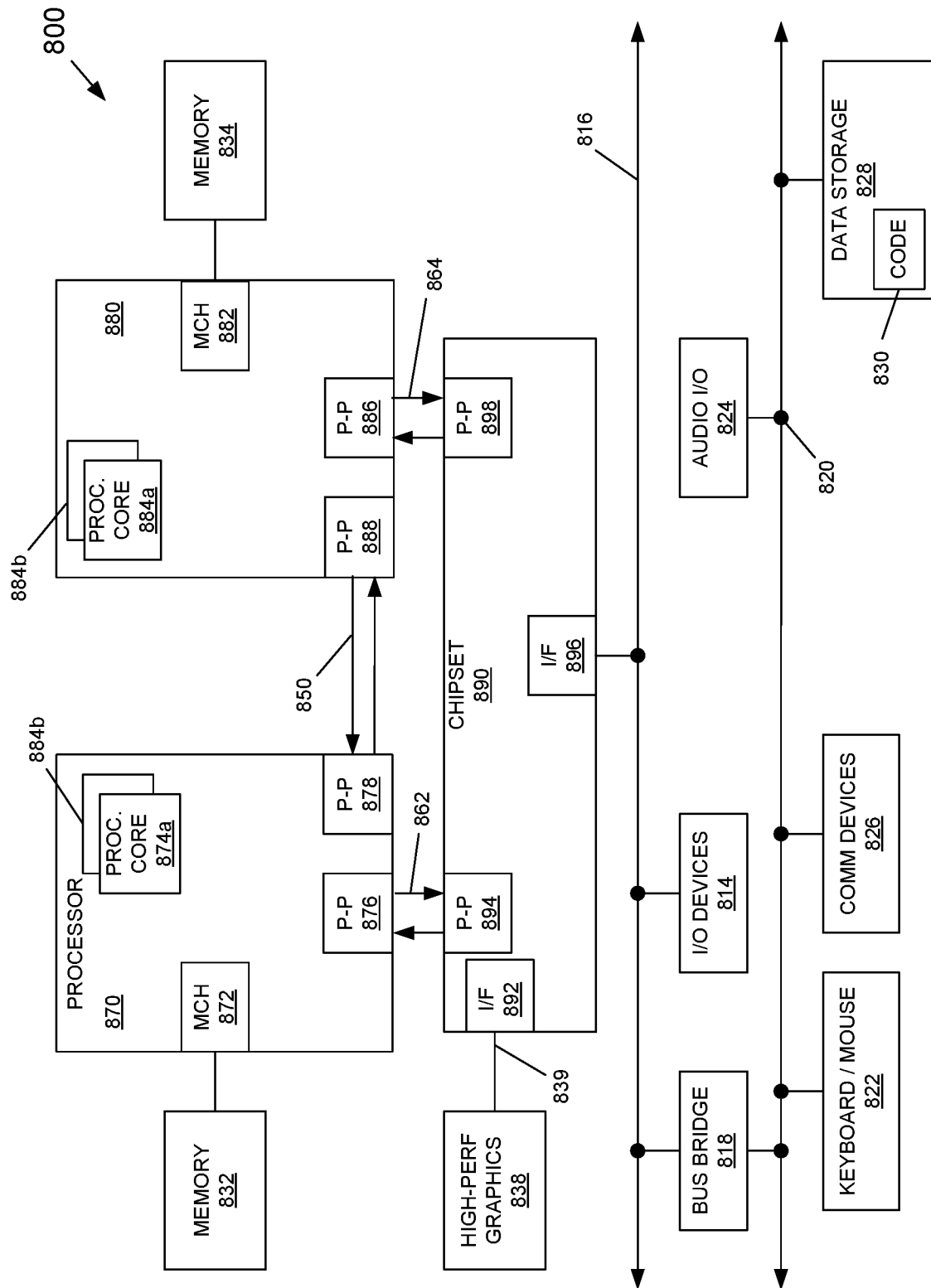
FIG. 7 is a block diagram of a system in accordance with an embodiment of the present invention.

Referring now to FIG. 7, shown is a block diagram of a system in accordance with an embodiment of the present invention. As shown in FIG. 7, multiprocessor system 800 includes a first processor 870 and a second processor 880 coupled via a point-to-point interconnect 850. As shown in FIG. 7, each of processors 870 and 880 may be many core processors including representative first and second processor cores (i.e., processor cores 874a and 874b and processor cores 884a and 884b).

Still referring to FIG. 7, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 7, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 7, chipset 890 includes P-P interfaces 894 and 898.

Furthermore, chipset 890 includes an interface 892 to couple chipset 890 with a high performance graphics engine 838, by a P-P interconnect 839. As shown in FIG. 7, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Any of the devices shown in FIG. 7 may be configured to perform bus master activities (including mode selection and control) for one or more of the interconnect structures, as described herein.

The following examples pertain to further embodiments.

In an example, an apparatus includes: a first controller to couple to an interconnect to which a plurality of devices may be coupled and to communicate first information via the interconnect according to the native communication protocol; a first transceiver to drive the first information onto a first line of the interconnect; a second transceiver to drive a clock signal onto a second line of the interconnect; and a second controller coupled to the first controller. The second controller may be adapted to communicate second information via the interconnect, where the native communication protocol is a single-ended communication protocol and the second controller is to communicate the second information differentially via the interconnect.

In an example, the apparatus further comprises a sensor sub-system comprising the first controller, the first transceiver and the second transceiver, where the first and second transceivers comprise single-ended transceivers.

In an example, the second controller comprises an audio controller to communicate audio data at a first data rate in a first mode and at a second data rate in a second mode, the second data rate greater than the first data rate.

In an example, the apparatus further comprises a selection circuit coupled between the audio controller and the first transceiver. The selection circuit may receive the audio data at the first data rate in the first mode and forward the audio data at the first data rate to the first transceiver, and the first transceiver may send the audio data at the first data rate via the first line of the interconnect.

In an example, in the first mode, the second transceiver is to send the clock signal via the second line, the clock signal to be used by a receiver device to clock the audio data at the first data rate.

In an example, the apparatus further comprises a physical unit circuit coupled to the audio controller that comprises a differential driver to send the audio data differentially at the second data rate.

In an example, in the second mode, the differential driver is to send the audio data at the second data rate via the first line and the second line of the interconnect.

In an example, in the second mode, the audio controller is to cause a clock generator associated with the first controller to provide a second clock signal at a second frequency to the physical unit circuit to enable the physical unit circuit to send the audio data at the second data rate.

In an example, the audio controller is to request control of the bus from the first controller in the second mode, and in response to the request, the first controller is to cause the first transceiver and the second transceiver to be disabled during the second mode.

In an example, the first controller is to send via the first line of the interconnect a command to one or more of the plurality of devices to cause the one or more devices to be configured for the communication of the audio data at the second data rate in the second mode.

In an example, in response to a request from the second controller for control of the interconnect, the first controller is to send a broadcast message to the plurality of devices via the interconnect and thereafter grant the control of the interconnect to the second controller and enter into a low power state, the second controller comprising at least one of an audio controller, a touch controller and a display controller.

In another example, a method comprises: receiving, in a bus controller of a device coupled to a bus, a request for a second controller of the device to be granted control of the bus; in response to the request, sending a broadcast message on the bus to a plurality of devices coupled to the bus to configure at least one device of the plurality of devices for receipt of a communication from the second controller; thereafter granting, by the bus controller, the second controller control of the bus and entering into a low power mode; and receiving, in the bus controller, a completion message from the second controller after the communication and, in response thereto, obtaining control of the bus by the bus controller.

In an example, the method further comprises, when the communication is to be in a second mode, causing one or more transceivers associated with the bus controller to be disabled.

In an example, the method further comprises sending, in the second mode, from the second controller, the communication comprising differential data to a differential physical unit circuit of the device to cause the differential physical unit circuit to send differential data along a data line and a clock line of the bus.

In an example, the method further comprises providing a clock signal from a clock generator of the device to the differential physical unit circuit in the second mode, the clock generator to generate the clock signal under control of the second controller.

In an example, the method further comprises sending, in a first mode, from the second controller, the communication comprising single-ended data along the data line and sending a clock signal generated in the clock generator via the clock line of the bus.

In an example, the method further comprises sending, via the bus controller, a directed message to the at least one device of the plurality of devices to cause the at least one device to perform a configuration operation.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises a first device having: a sensor sub-system including a bus controller to couple to a bus, the bus controller to be a master controller for the bus and to cause sensor data to be communicated on the bus; an audio sub-system including an audio controller to cause audio data to be communicated on the bus; and a physical unit circuit to communicate the sensor data and the audio data. In a first audio mode the physical unit circuit is to communicate single-ended audio data via a data line of the bus and communicate a clock signal via a clock line of the bus, and in a second audio mode the physical unit circuit is to communicate differential audio data via the data line and the clock line. The system may further include the bus coupled to the first device, a second device coupled to the bus, where the second device is to participate in the audio data communication with the first device, and a third device coupled to the bus, where the third device is to participate in the sensor data communication with the first device.

In an example, in response to a request from the audio sub-system, the bus controller is to send a first broadcast message via the bus to indicate an upcoming communication, send a second broadcast message to configure at least the second device for the second audio mode and thereafter enable the audio controller to control the bus during the second audio mode.

In an example, the physical unit circuit comprises: a first transceiver to drive the single-ended audio data onto the data line; a second transceiver to drive the clock signal onto the clock line; and a differential transceiver to drive the differential audio data onto the data line and the clock line.

In yet another example, an apparatus comprises: means for receiving a request for a second control means of a device to be granted control of a bus means; means for sending a broadcast message on the bus means to a plurality of devices coupled to the bus means to configure at least one device of the plurality of devices for receipt of a communication from the second control means; means for granting the second control means control of the bus means and for entering into a low power mode; and means for receiving a completion message from the second control means after the communication and means for obtaining control of the bus means.

In an example, the apparatus further comprises means for causing one or more transceiver means to be disabled.

In an example, the apparatus further comprises means for sending the communication comprising differential data to a differential physical means for sending differential data along a data line and a clock line of the bus means.

In an example, the apparatus further comprises means for providing a clock signal to the differential physical means.

In an example, the apparatus further comprises means for sending the communication comprising single-ended data along the data line and means for sending a clock signal via the clock line of the bus means.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first controller to couple to an interconnect to which a plurality of devices may be coupled, the first controller to communicate first information via the interconnect according to a native communication protocol;
   a first transceiver to drive the first information from the first controller onto a first line of the interconnect;
   a second transceiver to drive a first clock signal associated with the first information onto a second line of the interconnect; and
   a second controller coupled to the first controller, the second controller to communicate second information via the interconnect, wherein the native communication protocol is a single-ended communication protocol and the second controller is to communicate the second information onto the first line of the interconnect via the first transceiver and a second clock signal associated with the second information onto the second line of the interconnect via the second transceiver in a first mode and to communicate the second information differentially via the interconnect in a second mode.

2. The apparatus of claim 1, further comprising a sensor sub-system, the sensor sub-system comprising the first controller, the first transceiver and the second transceiver, wherein the first and second transceivers comprise single-ended transceivers.

3. The apparatus of claim 2, wherein the second controller comprises an audio controller to communicate audio data at a first data rate in the first mode and at a second data rate in the second mode, the second data rate greater than the first data rate.

4. The apparatus of claim 3, further comprising a selection circuit coupled between the audio controller and the first transceiver, the selection circuit to receive the audio data at the first data rate in the first mode and forward the audio data at the first data rate to the first transceiver, the first transceiver to send the audio data at the first data rate via the first line of the interconnect.

5. The apparatus of claim 4, wherein in the first mode, the second transceiver is to send the clock signal via the second line, the clock signal to be used by a receiver device to clock the audio data at the first data rate.

6. The apparatus of claim 3, further comprising a physical unit circuit coupled to the audio controller, the physical unit circuit comprising a differential driver to send the audio data differentially at the second data rate.

7. The apparatus of claim 6, wherein in the second mode, the differential driver is to send the audio data at the second data rate via the first line and the second line of the interconnect.

8. The apparatus of claim 6, wherein in the second mode, the audio controller is to cause a clock generator associated with the first controller to provide the second clock signal at a second frequency to the physical unit circuit to enable the physical unit circuit to send the audio data at the second data rate.

9. The apparatus of claim 3, wherein the audio controller is to request control of the interconnect from the first controller in the second mode, and in response to the request, the first controller is to cause the first transceiver and the second transceiver to be disabled during the second mode.

10. The apparatus of claim 3, wherein the first controller is to send via the first line of the interconnect a command to one or more of the plurality of devices to cause the one or more devices to be configured for the communication of the audio data at the second data rate in the second mode.

11. The apparatus of claim 1, wherein in response to a request from the second controller for control of the interconnect, the first controller is to send a broadcast message to the plurality of devices via the interconnect and thereafter grant the control of the interconnect to the second controller and enter into a low power state, the second controller comprising at least one of an audio controller, a touch controller and a display controller.

12. A non-transitory machine-readable medium having stored thereon instructions, which if performed by a machine cause the machine to perform a method comprising:
   receiving, in a bus controller of a device coupled to a bus, a request for a second controller of the device to be granted control of the bus;
   in response to the request, sending a broadcast message on the bus to a plurality of devices coupled to the bus to configure at least one device of the plurality of devices for receipt of a communication from the second controller;
   thereafter granting, by the bus controller, the second controller control of the bus by relinquishing control of the bus and entering into a low power mode; and
   receiving, in the bus controller, a completion message from the second controller after the communication and, in response thereto, obtaining control of the bus by the bus controller.

13. The non-transitory machine-readable medium of claim 12, wherein the method further comprises, when the communication is to be in a second mode, causing one or more transceivers associated with the bus controller to be disabled.

14. The non-transitory machine-readable medium of claim 13, wherein the method further comprises sending, in the second mode, from the second controller, the communication comprising differential data to a differential physical unit circuit of the device to cause the differential physical unit circuit to send differential data along a data line and a clock line of the bus.

15. The non-transitory machine-readable medium of claim 14, wherein the method further comprises providing a clock signal from a clock generator of the device to the differential physical unit circuit in the second mode, the clock generator to generate the clock signal under control of the second controller.

16. The non-transitory machine-readable medium of claim 15, wherein the method further comprises sending, in a first mode, from the second controller, the communication comprising single-ended data along the data line and sending a clock signal generated in the clock generator via the clock line of the bus.

17. The non-transitory machine-readable medium of claim 12, wherein the method further comprises sending, via the bus controller, a directed message to the at least one device of the plurality of devices to cause the at least one device to perform a configuration operation.

18. A system comprising:
a first device having:
a sensor sub-system including a bus controller to couple to a bus, the bus controller to be a master controller for the bus and to cause sensor data to be communicated on the bus;
an audio sub-system including an audio controller to cause audio data to be communicated on the bus;
a physical unit circuit to communicate the sensor data received from the sensor sub-system and the audio data received from the audio sub-system on the bus, wherein in a first audio mode the physical unit circuit is to communicate single-ended audio data via a data line of the bus and communicate a clock signal via a clock line of the bus, and in a second audio mode the physical unit circuit is to communicate differential audio data via the data line and the clock line;
the bus coupled to the first device;
a second device coupled to the bus, wherein the second device is to participate in the audio data communication with the first device; and
a third device coupled to the bus, wherein the third device is to participate in the sensor data communication with the first device.

19. The system of claim 18, wherein, in response to a request from the audio sub-system, the bus controller is to send a first broadcast message via the bus to indicate an upcoming communication, send a second broadcast message to configure at least the second device for the second audio mode and thereafter enable the audio controller to control the bus during the second audio mode.

20. The system of claim 18, wherein the physical unit circuit comprises:
a first transceiver to drive the single-ended audio data onto the data line;
a second transceiver to drive the clock signal onto the clock line; and
a differential transceiver to drive the differential audio data onto the data line and the clock line.

* * * * *